US006607227B1

(12) United States Patent
Morton

(10) Patent No.: US 6,607,227 B1
(45) Date of Patent: Aug. 19, 2003

(54) SAWTOOTH TERMINAL BLADE GRIPPER AND METHOD OF GRIPPING

(75) Inventor: Gregory R. Morton, Yorktown, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/605,386

(22) Filed: Jun. 28, 2000

(51) Int. Cl.[7] .......................... B66C 1/42; B25J 15/00; H01R 43/04

(52) U.S. Cl. .................... 294/119.1; 294/901; 269/268; 269/272; 269/902; 606/207; 901/39; 29/748; 29/749; 29/751; 29/753

(58) Field of Search ............................ 294/119.1, 118, 294/902, 86.4; 901/39; 606/207; 29/564.1, 564.2, 747, 748, 749, 751, 753, 861, 863; 414/786

(56) References Cited

U.S. PATENT DOCUMENTS

| | | | | | |
|---|---|---|---|---|---|
| 231,181 | A | * | 8/1880 | Lewis | 269/272 |
| 1,137,693 | A | * | 4/1915 | Baxter | 269/272 |
| 1,617,364 | A | * | 2/1927 | Bacon | 269/272 |
| 1,982,207 | A | * | 11/1934 | Furniss | 606/148 |
| 2,668,538 | A | * | 2/1954 | Baker | 294/118 |
| 3,010,183 | A | * | 11/1961 | Forney, Jr. | 29/863 |
| 3,101,715 | A | * | 8/1963 | Glassman | 606/148 |
| 3,579,912 | A | * | 5/1971 | Panko et al. | 269/268 |
| 3,608,554 | A | * | 9/1971 | McGuinness | 606/207 |
| 3,683,925 | A | * | 8/1972 | Frankel | 606/207 |
| 4,139,937 | A | | 2/1979 | L'Homme | 29/754 |
| 4,153,239 | A | * | 5/1979 | La Roccoc | 269/902 |
| 4,488,641 | A | * | 12/1984 | Nishiguchi et al. | 269/902 |
| 4,562,632 | A | * | 1/1986 | Parchet et al. | 269/902 |
| 4,654,967 | A | | 4/1987 | Thenner | 29/860 |
| 4,805,889 | A | * | 2/1989 | Liepse | 269/902 |
| 4,815,460 | A | * | 3/1989 | Porat et al. | 294/902 |
| 4,837,926 | A | | 6/1989 | Boutcher, Jr. | 29/747 |
| 4,898,238 | A | * | 2/1990 | Grantom | 269/902 |
| 4,967,470 | A | | 11/1990 | Folk | 29/747 |
| 5,031,303 | A | * | 7/1991 | Orain | 269/268 |
| 5,167,482 | A | * | 12/1992 | Cross | 901/39 |
| 5,178,431 | A | | 1/1993 | Voellmer | 294/86.4 |
| 5,236,331 | A | * | 8/1993 | Liu | 29/751 |
| 5,255,948 | A | | 10/1993 | Wiercienski et al. | 294/86.41 |
| 5,304,203 | A | * | 4/1994 | El-Mallawany et al. | 606/207 |
| 5,411,481 | A | * | 5/1995 | Allen et al. | 606/207 |
| 5,454,822 | A | * | 10/1995 | Schob et al. | 606/148 |
| 5,496,341 | A | * | 3/1996 | Sauer et al. | 606/207 |
| 5,606,793 | A | | 3/1997 | Gross et al. | 29/760 |
| 6,000,688 | A | * | 12/1999 | Giangrasso | 269/268 |
| 6,077,280 | A | * | 6/2000 | Fossom | 606/151 |
| 6,099,539 | A | * | 8/2000 | Howell et al. | 606/151 |
| 6,243,947 | B1 | * | 6/2001 | Fujita et al. | 29/863 |
| 6,270,383 | B1 | * | 8/2001 | Wielsch et al. | 439/828 |
| 6,387,117 | B1 | * | 5/2002 | Arnold, Jr. et al. | 606/207 |

FOREIGN PATENT DOCUMENTS

| | | | |
|---|---|---|---|
| GB | 2210574 | * | 6/1989 |

* cited by examiner

*Primary Examiner*—Dean J. Kramer
*Assistant Examiner*—Paul T. Chin

(57) ABSTRACT

A gripping apparatus is disclosed. The gripping apparatus includes a first finger including a plurality of first sawteeth along a first longitudinal end and a receiving area being located between adjacent sawteeth and a second finger including a plurality of complementary sawteeth juxtaposed from the first sawteeth. One of the first and second fingers is movable relative toward the other of the first and second fingers such that an object to be gripped is positioned in the receiving area by one of the plurality of complementary sawteeth. The object is releasably retained against the receiving area by the second finger. A method of gripping an object is also disclosed.

8 Claims, 7 Drawing Sheets

SAWTOOTH TERMINAL BLADE GRIPPER AND METHOD OF GRIPPING

FIELD OF THE INVENTION

The present invention relates to grippers which are used to correct alignment of and to load electrical terminals into precise tooling, as well as a method used to precisely grip an object.

BACKGROUND OF THE INVENTION

Currently, many insert-molding applications involve the placement of multiple electrical terminals into a mold cavity with precise insertion into a core slide. This core slide usually forms a portion of molded plug geometry around the electrical terminals. With today's modem electrical connectors, smaller watertight and even airtight designs are quickly becoming the standard in the automotive and computer industries. The designs, therefore, require tighter tolerances and more precise part-to-part tolerances than before. Current automated assembly and molding processes are not successful in ensuring absolute quality and yield.

It would be beneficial to provide a tool which can grasp and locate electrical terminals in a desired location during precision manufacturing, and improving the quality and yield of a manufactured product.

BRIEF SUMMARY OF THE INVENTION

A gripping apparatus is provided. The gripping apparatus comprises a first finger including a plurality of first sawteeth along a first longitudinal end and a receiving area being located between adjacent sawteeth and a second finger including a plurality of complementary sawteeth juxtaposed from the first sawteeth. One of the first and second fingers being movable relative toward the other of the first and second fingers such that an object to be gripped is positioned in the receiving area by one of the plurality of complementary sawteeth. The object is releasably retained against the receiving area by the second finger.

A method of gripping an object is also provided. The method comprises locating the object between first and second fingers, the first finger including a plurality of first sawteeth along a first longitudinal side, a receiving area being located between adjacent sawteeth and the second finger including a plurality of complementary sawteeth juxtaposed from the first sawteeth; and moving one of the first and second fingers relative toward the other of the first and second fingers, the first and second fingers maneuvering the object between the receiving area and the second finger, the second finger releasably retaining the object against the receiving area.

BRIEF DESCRIPTION OF THE DRAWINGS

The accompanying drawings, which are incorporated herein, and constitute part of this specification, illustrate the presently preferred embodiments of the invention, and, together with the general description given above and the detailed description given below, serve to explain the features of the invention. In the drawings.

DETAILED DESCRIPTION OF THE PREFERRED EMBODIMENTS

Figure 1:
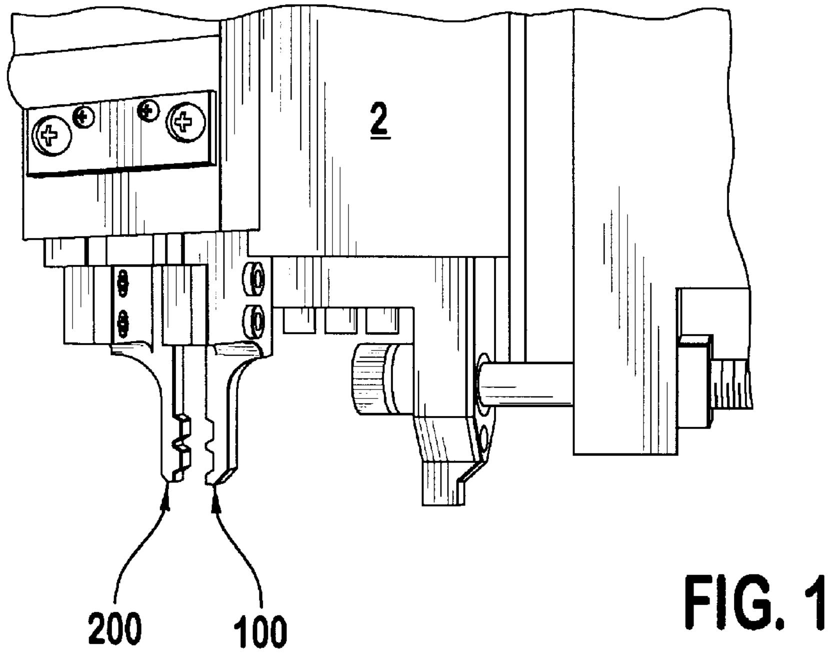
FIG. 1 is a perspective view of a preferred tool which employs a gripper according to a preferred embodiment of the present invention in an open position.
Figure 2:
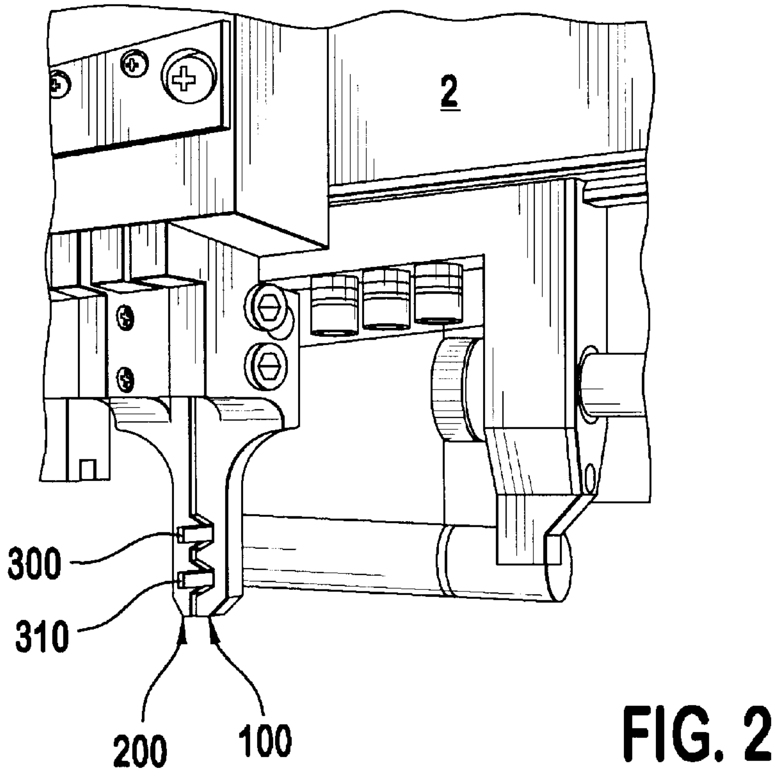
FIG. 2 is a perspective view of the preferred tool which employs a gripper according to a preferred embodiment of the present invention gripping two electrical terminal blades.

A first embodiment of a gripping apparatus 2 used to grip terminal blades 300, 310 during assembly of a fuel injector is shown in FIGS. 1 and 2. The gripping apparatus 2 is preferably part of an automated assembly line which manufactures fuel injectors, although those skilled in the art will recognize that the present invention can be used on other types of precision manufactures as well, such as circuit boards. A fuel injector having terminal blades which can be inserted into the fuel injector assembly using the apparatus and method of the present invention is disclosed in U.S. Pat. No. 6,047,907, which is incorporated by reference herein.

During the preferred assembly of fuel injectors, the terminal blades 300, 310 are gripped by a first finger 100 and a second finger 200 on the gripping apparatus 2 and inserted into a mold cavity (not shown). The first finger 100 and the second finger 200 comprise a pair of gripper fingers 10. The fingers 10 align the terminal blades 300, 310 in a predetermined location for precise assembly into the fuel injector (not shown), as will be described in more detail herein.

Figure 3:
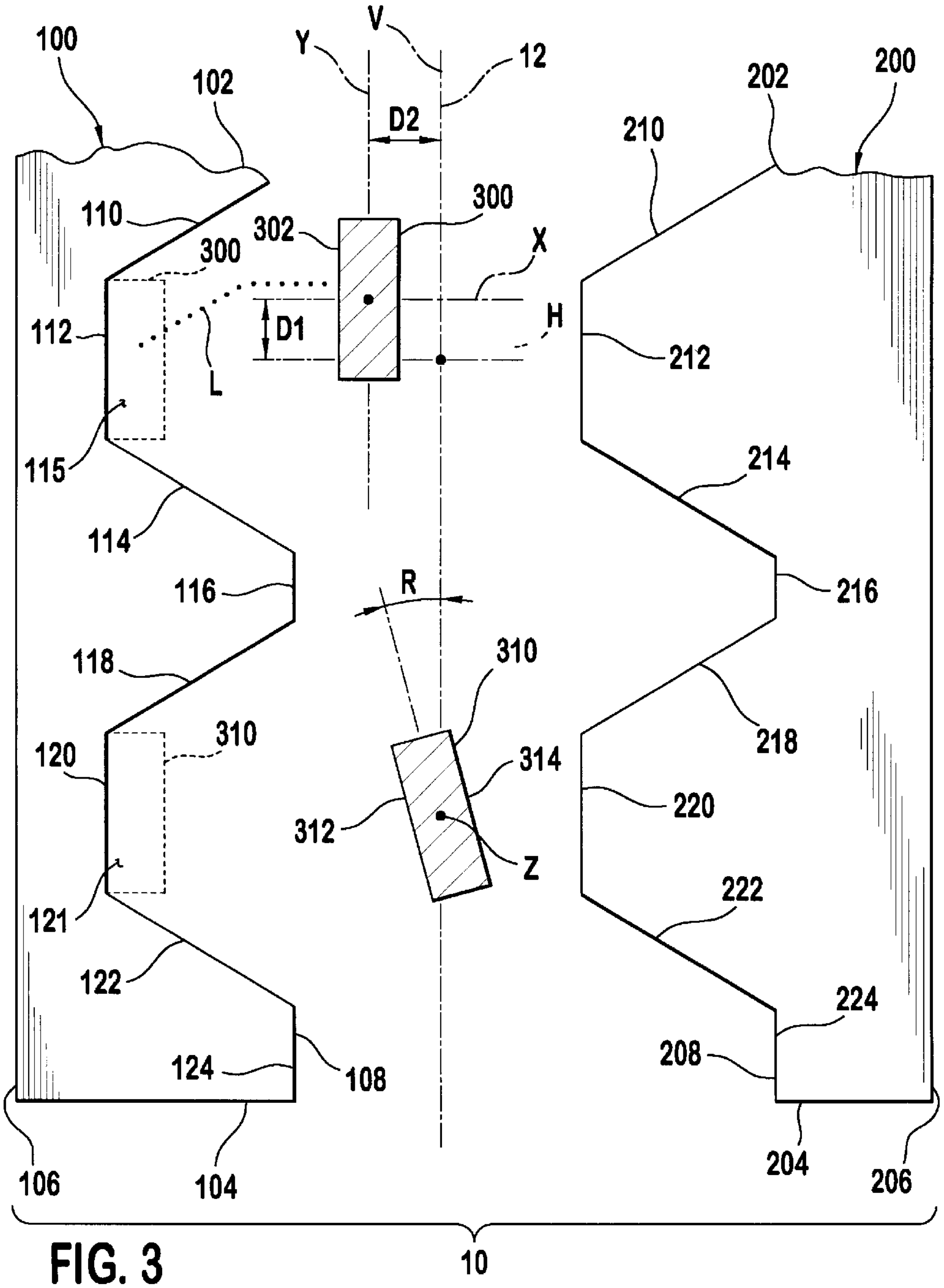
FIG. 3 is an enlarged side view of a lower portion of a first embodiment of a pair of gripper fingers in an open position with objects to be gripped therebetween.
Figure 4:
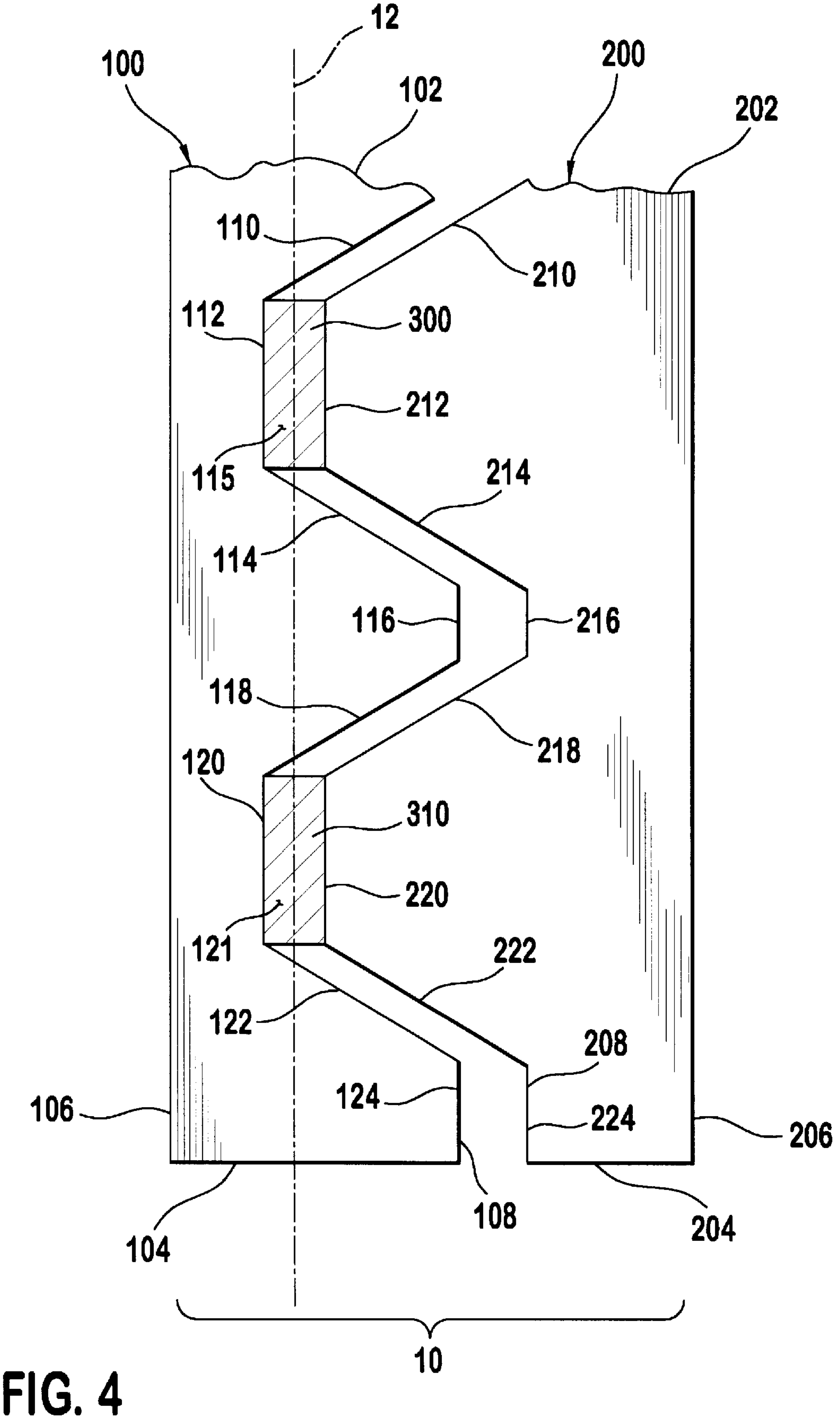
FIG. 4 is an enlarged side view of the lower portion of the first embodiment of the pair of gripper fingers in a closed position gripping the objects.

A first embodiment of the invention is shown in FIGS. 3 and 4. The gripper fingers 10 include a generally longitudinal axis 12 which extends between the fingers 100, 200 when the fingers 100, 200 are in an open position. The first finger 100 includes an upper end 102, a lower end 104, an outside longitudinal end 106 and an inside longitudinal end 108. Preferably, the outside longitudinal end 106 is generally straight and parallel to the longitudinal axis 12. The inside longitudinal end 108 includes a plurality of sawteeth formed by adjacent sides as now described.

As seen in FIG. 3, a first side 110 extends obliquely downward and away from the longitudinal axis 12. A second side 112, adjacent to the downstream end of the first side 110, extends downward generally parallel to the longitudinal axis 12. As used herein, the term "downward" means toward the bottom of the referenced figure. A third side 114, adjacent to the downstream end of the second side 112, extends obliquely downward and toward the longitudinal axis 12. A receiving area 115 is formed in a space partially bounded by first side 110, second side 112, and third side 114. A fourth side 116, adjacent to the downstream end of the third side 114, extends downward generally parallel to the longitudinal axis 12.

A fifth side 118 extends obliquely downward and away from the longitudinal axis 12. A sixth side 120, adjacent to the downstream end of the fifth side 118, extends downward generally parallel to the longitudinal axis 12. A seventh side 122, adjacent to the downstream end of the sixth side 120, extends obliquely downward and toward the longitudinal axis 12. A receiving area 121 is formed is a space partially bounded by fifth side 118, sixth side 120, and seventh side 122. An eighth side 124, adjacent to the downstream end of the seventh side 122, extends downward generally parallel to the longitudinal axis 12.

The second finger 200 includes a like number of complementary sawteeth and sides as the first finger 100 and juxtaposed from the sawteeth and sides on the first finger 100. A first side 210 extends obliquely downward and toward the longitudinal axis 12. A second side 212, adjacent to the downstream end of the first side 210, extends downward generally parallel to the longitudinal axis 12. A third side 214, adjacent to the downstream end of the second side 212, extends obliquely downward and away from the longitudinal axis 12. A fourth side 216, adjacent to the downstream end of the third side 214, extends downward generally parallel to the longitudinal axis 12.

A fifth side 218 extends obliquely downward and toward the longitudinal axis 12. A sixth side 220, adjacent to the downstream end of the fifth side 218, extends downward generally parallel to the longitudinal axis 12. A seventh side 222, adjacent to the downstream end of the sixth side 220, extends obliquely downward and away from the longitudinal axis 12. An eighth side 224, adjacent to the downstream end of the seventh side 222, extends downward generally parallel to the longitudinal axis 12.

Those skilled in the art will recognize that the above-described pattern of sawteeth can continue either below the eighth sides 124, 224 of the first and second fingers 100, 200, respectively or above the first sides 110, 210, of the first and second fingers 100, 200, respectively, and as many receiving areas as desired can be formed in the sawteeth. Additionally, the plurality of sides 110, 112, 114, 116, 118, 120, 122, 124, 210, 212, 214, 216, 218, 220, 222, 224 are preferably flat, although those skilled in the art will recognize that the sides 110, 112, 114, 116, 118, 120, 122, 124, 210, 212, 214, 216, 218, 220, 222, 224 can be other shapes as well.

The oblique alignment of the first, third, fifth, and seventh sides 110, 114, 118, 122, 210, 214, 218, 222, of the first and second fingers 100, 200, respectfully, provides a lead-in angle for misaligned terminal blades to be guided into a predetermined position as the fingers 100, 200 close together, as described below.

Initially, the fingers 100, 200 are separated and distal from the longitudinal axis 12, as shown in FIG. 3. During operation, either the first finger 100 can move to the right as shown in FIG. 3, the second finger 200 can move to the left, or both the first and second fingers 100, 200 can move toward each other in order to grip the terminal blades 300, 310.

An object to be gripped, such as a terminal blade 300 or a terminal blade 310, are generally located between the first and second fingers 100, 200. Although it is preferred that the terminal blades 300, 310 are initially properly aligned in predetermined positions, either or both of the first and second terminal blades 300, 310 may be at least slightly misaligned from the predetermined positions.

An optimal location of the terminal blade is at the intersection of a horizontal axis H and a vertical axis V prior to gripping by the finger pair 10. As seen in FIG. 3, the terminal blade 300 is displaced from the horizontal axis H by a distance D1, and from the vertical axis V by a distance D2. The distances D1, D2 represent displacements from the optimal location for the terminal blade 300 to be gripped by the pair of fingers 10. As the fingers 100, 200 move toward each other, the terminal blade 300 first engages the first finger 100, due to the horizontal distance D2 that the terminal blade 300 is offset from the optimal location. A top left corner of the terminal blade 300 engages the first side 110 due to the vertical distance D1 that the terminal blade 300 is offset from the optimal location. As the first finger 100 continues to move toward the right, the oblique angle of the first side 110 forces the terminal blade 300 to slide downward toward the receiving area 115, translating the terminal blade 300 along both an “X” axis and a “Y” axis which define the plane of the paper of FIG. 3. Also, by this time, the second side 212 of the second finger 200 has engaged the right side 304 of the terminal blade 300, assisting in forcing the terminal blade 300 downward toward the receiving area 115.

When the terminal blade 300 reaches the receiving area 115, the terminal blade 300 is stopped by the second side 112 of the first finger 100 and the left side 302 of the terminal blade 300 aligns itself between the second side 112, 212 of the first and second fingers 100, 200, respectively, and between the first and third sides 110, 114. The final location of the terminal blade 300 with respect to the first finger 100 is shown in dashed lines in FIG. 3. The terminal blade 300 is now gripped by the finger pair 10, and is in the optimal location for inserting the terminal blade 300 into the mold (not shown), as seen in FIG. 4. As can be seen in FIG. 4, a space exists between the first and second fingers 100, 200 which corresponds to the width of the terminal blade 300.

Also, as seen in FIG. 3, the terminal blade 310 is axially rotated about an axis “Z” which extends from the plane of the paper. The terminal blade 310 is rotated an angle “R” from an optimal orientation. As the first and second fingers 100, 200 come together to grip the terminal blade 310, the top left corner of the terminal blade 310 is engaged by the fifth side 118 of the first finger 100 and the bottom right corner of the terminal blade 310 is engaged by the fifth side 218 of the second finger 200 due to the rotation of the terminal blade 310 with respect to the optimal orientation. As the two fingers 100, 200 come together, the fingers 100, 200 rotate the terminal blade 310 about the Z axis clockwise from the orientation shown in FIG. 3.

Any vertical or horizontal misalignment of the terminal blade 310 from the optimal location is corrected by the fingers 100, 200, as described above with regard to the alignment of the terminal blade 300. The final location of the terminal blade 310 with respect to the first finger 100 is in the receiving area 121 as shown in dashed lines in FIG. 3. Those skilled in the art will recognize that the alignment of the terminal blade 310 can be performed simultaneously with the alignment of the terminal blade 300.

As shown in FIG. 4, once the fingers 100, 200 grip the terminal blades 300, 310, the terminal blades 300, 310 are located in a precisely aligned location with respect to the fingers 100, 200 and with each other, allowing for proper precision assembly into the mold cavity. After the terminal blades 300, 310 are moved by the fingers 100, 200 to a desired location, such as the mold cavity, the fingers 100, 200 separate, releasing the terminal blades 300, 310, and repeating the process for the next terminal blades 300, 310.

Figure 5:
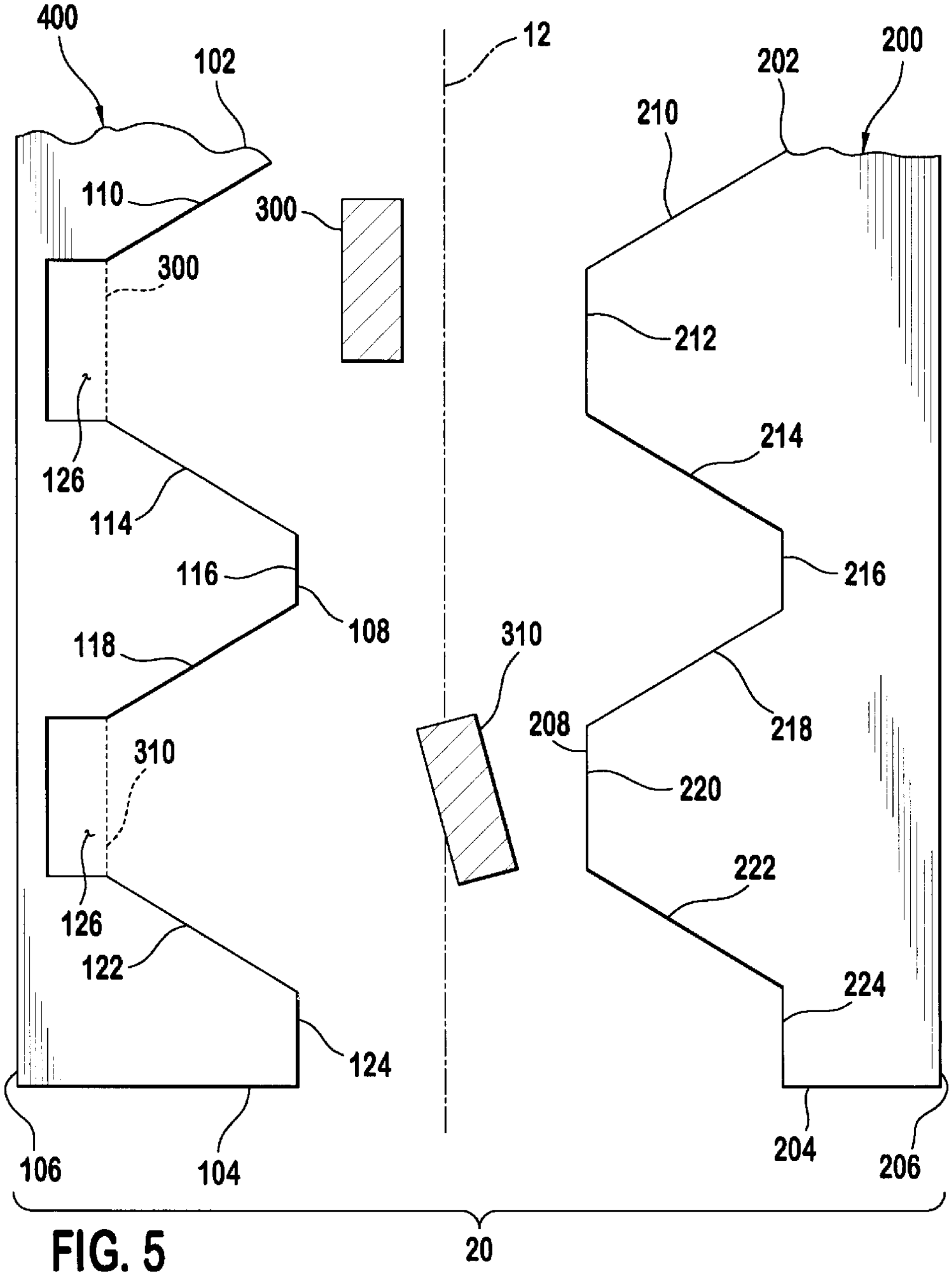
FIG. 5 is an enlarged side view of a lower portion of a second embodiment of a pair of gripper fingers in an open position with objects to be gripped therebetween.
Figure 6:
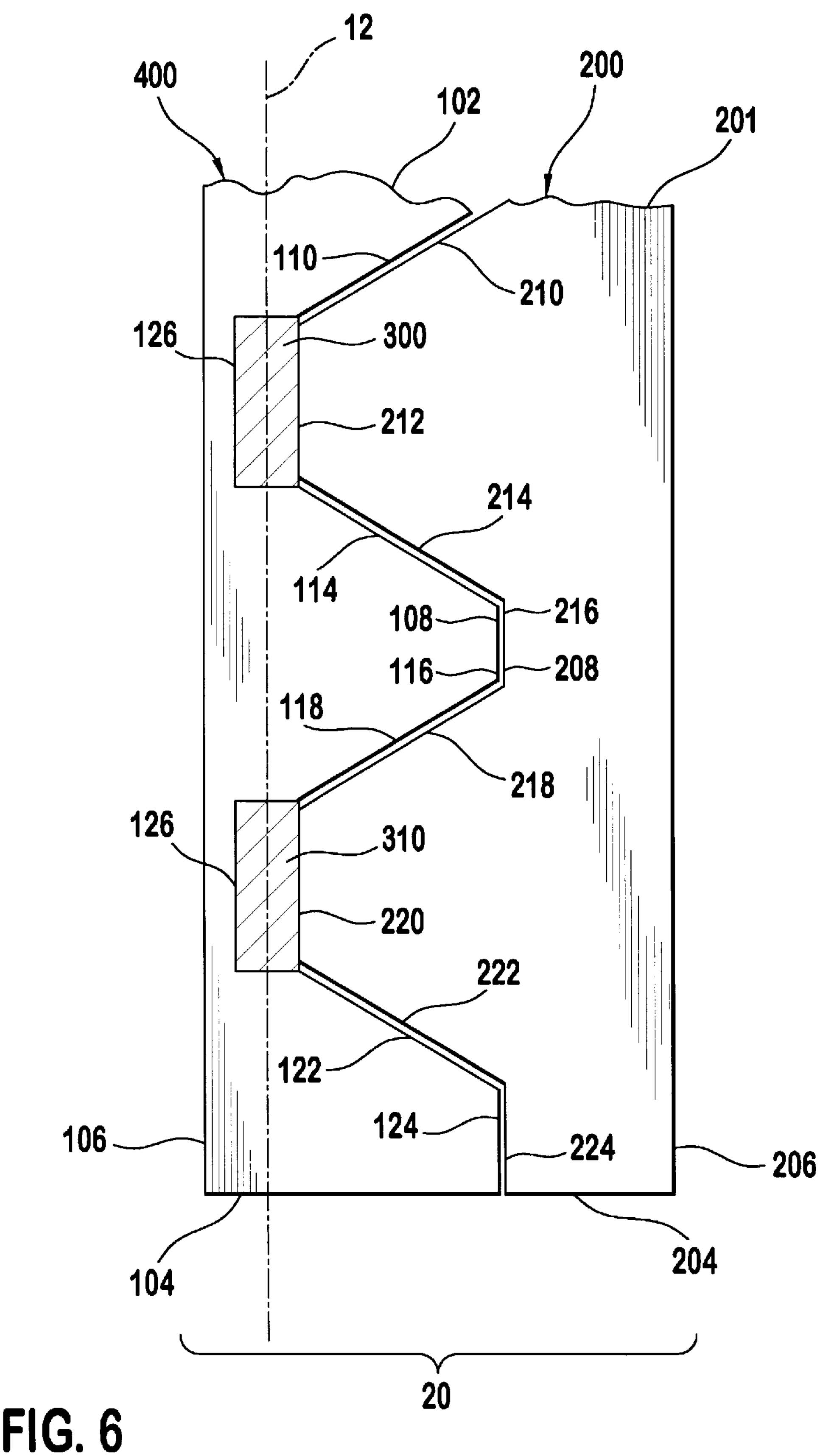
FIG. 6 is an enlarged side view of the lower portion of the second embodiment of the pair of gripper fingers in a closed position gripping the objects.

A second embodiment 20 of the preferred invention is shown in FIGS. 5 and 6. The second embodiment 20 is similar to the first embodiment 10 with the exception of recessed pockets 126 located between faces 110, 114 and

118, 122. The recessed pockets 126 allow the first and second fingers 100, 200 to mate, with complementary sides 110/210, 114/214, 116/216, 118/218, 122/222, and 124/224 of the first and second fingers 100, 200, respectively, as shown in FIG. 6. The second embodiment also provides a more precise alignment and allowing free movement of the terminal blades 300, 310 within each respective recessed pocket 126. Operation of the second embodiment 20 is the same as the operation of the first embodiment 10 as described above, but with each terminal blade 300, 310 being located in a respective recessed pocket 126 once the fingers 100, 200 have come together.

Figure 7:
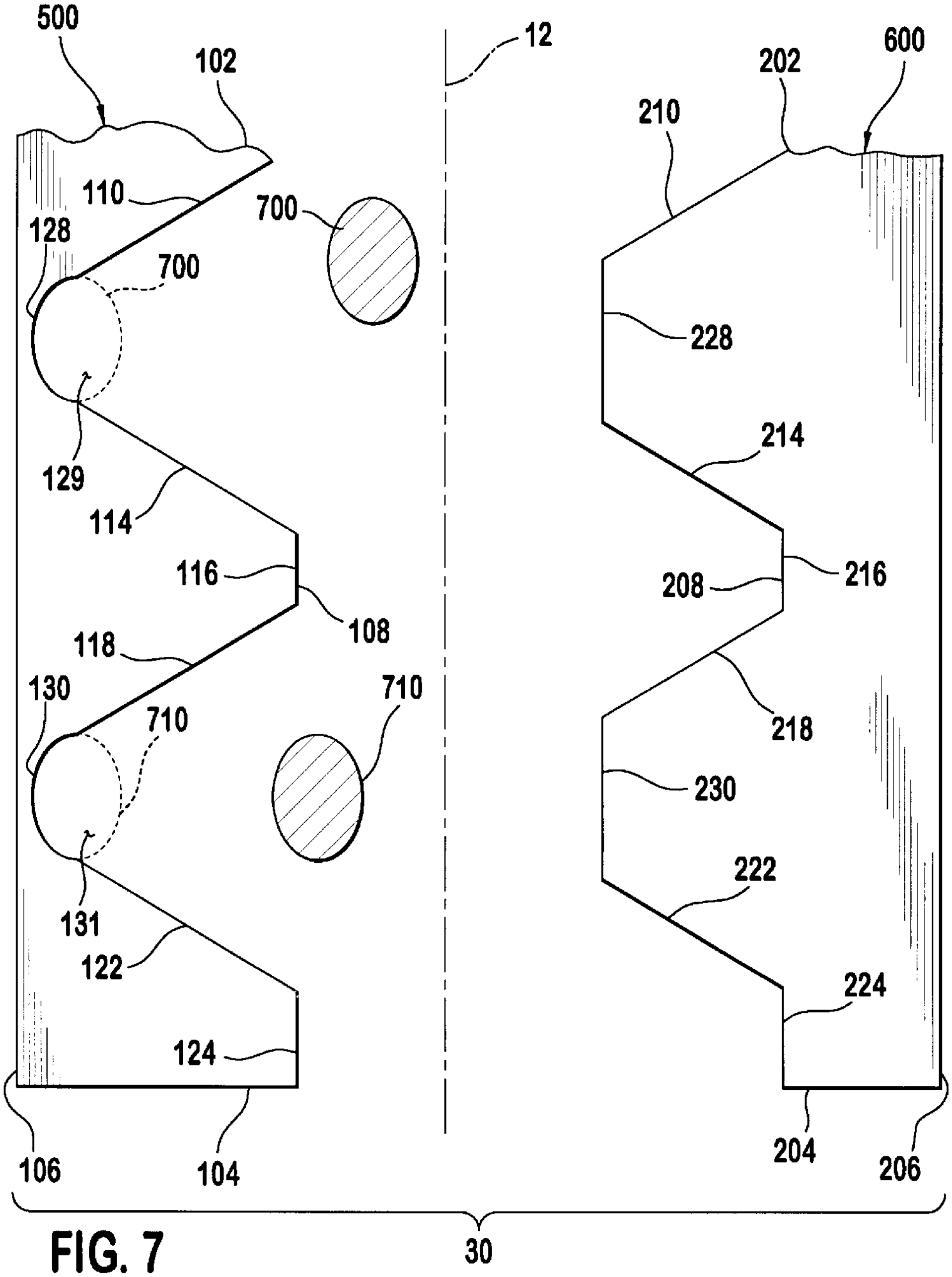
FIG. 7 is an enlarged side view of a lower portion of a third embodiment of a pair of gripper fingers in an open position with objects to be gripped therebetween.
Figure 8:
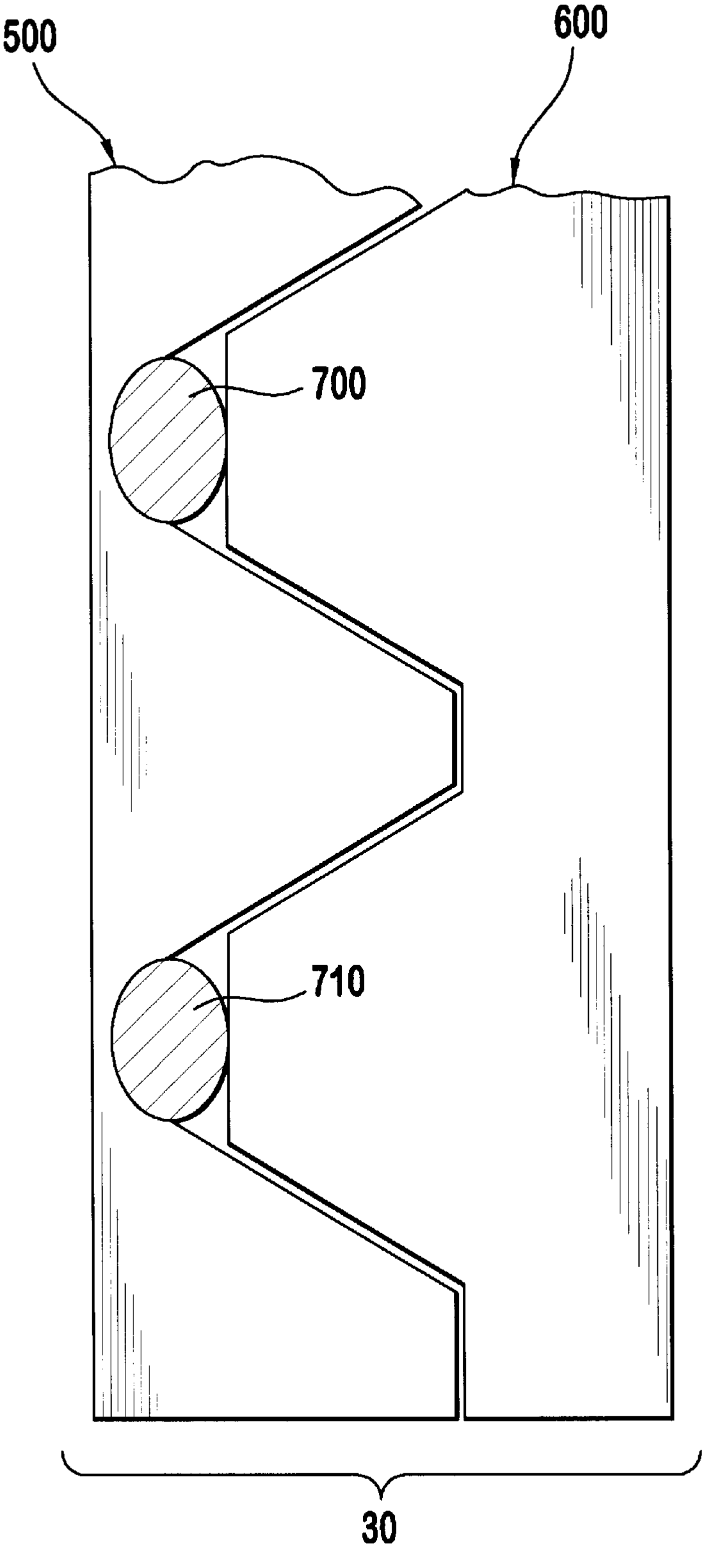
FIG. 8 is an enlarged side view of the lower portion of the third embodiment of the pair of gripper fingers in a closed position gripping the objects.

A third embodiment 30 of the present invention is shown in FIGS. 7 and 8. The third embodiment 30 is similar to the second embodiment with the exception that the side 128, 130 on a first finger 500 is curved. The curved sides 128, 130 form curved or rounded recessed pockets 129, 131 which conform to the contours of terminal blades 700, 710, which have generally circular cross-sectional areas. The second finger 600 has corresponding flat sides 228, 230 which force the terminal blades 700, 710, respectively, into the pockets 129, 131 during gripping.

Operation of the third embodiment 30 is similar to the operation of the second embodiment 20, with the terminal blades 700, 710 being grasped within the recessed pockets 129, 131 of the fingers 500, 600.

Those skilled in the art will recognize that blades with cross-sectional geometries other than rectangular or circular can be used, so long as the receiving areas or pockets are configured with the same geometry as the cross-section of the terminal blade being used. If a terminal blade with a different cross-section is desired, the first and second fingers 100, 200 are simply removed from the apparatus 2 and other fingers with matching geometries, such as the fingers of the third embodiment, shown in FIGS. 7 and 8, are installed in the apparatus 2.

The preferred embodiments of the present invention, as disclosed above, are used to realize faster processing times, eliminate steps in the manufacturing process, and improve the overall quality of the terminal blade 300, 310 loading process. Additionally, the terminal blades 300, 310 can be held by the fingers 100, 200 with a high force, enabling the apparatus 2 to move at high speeds and allowing stable loading of the terminal blades 300, 310 into the mold cavity. Additionally, the present invention allows for more tolerance in material handling equipment such as transport systems, feeding systems, and workpiece carriers, as, any errors will be corrected when the fingers 100, 200 grip the terminal blades 300, 310.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

What is claimed is:

1. An automated gripping apparatus for electrical terminal blades of a fuel injector, the apparatus comprising:

a first finger extending along a longitudinal axis, the first finger having a plurality of recessed portions spaced apart by at least one sawtooth, each recessed portion having first and second sides extending oblique to the longitudinal axis and a third side extending linearly between the first and second sides, the third side defining a receiving area between first and second sides of the recessed portions; and a second finger including a plurality of sawteeth, each of the sawteeth having fourth and fifth sides extending oblique to the longitudinal axis and a sixth side extending linearly between the fourth and fifth sides, each sawteeth adapted to mate with a respective one of the recessed portions, one of the first and second fingers being movable linearly towards each other such that the electrical terminal blades to be gripped is positioned in the receiving area by one of the plurality of sawteeth and one of the recessed portions, the terminal blades being retained against the receiving area by the first and second fingers.

2. The gripping apparatus according to claim 1, wherein the first and second fingers translate the electrical terminal blades along at least one of first and second axes.

3. The gripping apparatus according to claim 1, wherein the first and second fingers rotate the electrical terminal blades about a third axis.

4. The gripping apparatus according to claim 1, wherein the receiving area comprises a recessed pocket.

5. The gripping apparatus according to claim 1, wherein the receiving area includes a plurality of generally flat surfaces.

6. The gripping apparatus according to claim 1, wherein each electrical terminal blade includes at least one curved surface.

7. The gripping apparatus according to claim 1, further comprising a plurality of receiving areas.

8. The gripping apparatus according to claim 7, wherein a plurality of electrical terminal blade can be gripped simultaneously, one object against each receiving area.

* * * * *